US012754857B2

(12) United States Patent
Roweth et al.

(10) Patent No.: US 12,754,857 B2
(45) **Date of Patent: *Oct. 6, 2026**

(54) SYSTEM AND METHOD FOR FACILITATING DYNAMIC COMMAND MANAGEMENT IN A NETWORK INTERFACE CONTROLLER (NIC)

(71) Applicant: Hewlett Packard Enterprise Development LP, Spring, TX (US)

(72) Inventors: Duncan Roweth, Bristol (GB); Abdulla M. Bataineh, Vista, CA (US); Edwin L. Froese, Burnaby (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 18/418,509

(22) Filed: Jan. 22, 2024

(65) Prior Publication Data

US 2024/0160584 A1 May 16, 2024

Related U.S. Application Data

(63) Continuation of application No. 17/594,610, filed as application No. PCT/US2020/024250 on Mar. 23, 2020, now Pat. No. 11,899,596.

(Continued)

(51) Int. Cl.
*G06F 13/16* (2006.01)
*G06F 9/50* (2006.01)
(Continued)

(52) U.S. Cl.
CPC .......... *G06F 13/1642* (2013.01); *G06F 9/505* (2013.01); *G06F 9/546* (2013.01); *G06F 12/0862* (2013.01); *G06F 12/1036* (2013.01); *G06F 12/1063* (2013.01); *G06F 13/14* (2013.01); *G06F 13/16* (2013.01); *G06F 13/1673* (2013.01); *G06F 13/28* (2013.01);
(Continued)

(58) Field of Classification Search
CPC .................................................. G06F 13/1642
USPC ......................................................... 711/154
See application file for complete search history.

(56) References Cited

U.S. PATENT DOCUMENTS 8,131,814 B1 * 3/2012 Schlansker ............. G06F 13/28 709/212
2007/0124550 A1 * 5/2007 Nonaka ................. G06F 3/0614 711/154
(Continued)

*Primary Examiner* — Titus Wong
(74) *Attorney, Agent, or Firm* — Yao Legal Services, Inc.

(57) ABSTRACT

A network interface controller (NIC) capable of efficient command management is provided. The NIC can be equipped with a host interface, an arbitration logic block, and a command management logic block. During operation, the host interface can couple the NIC to a host device. The arbitration logic block can select a command queue of the host device for obtaining a command. The command management logic block can determine whether an internal buffer associated with the command queue includes a command. If the internal buffer includes the command, the command management logic block can obtain the command from the internal buffer. On the other hand, if the internal buffer is empty, the command management logic block can obtain the command from the command queue via the host interface.

19 Claims, 10 Drawing Sheets

Related U.S. Application Data

(60) Provisional application No. 62/852,289, filed on May 23, 2019, provisional application No. 62/852,203, filed on May 23, 2019, provisional application No. 62/852,273, filed on May 23, 2019.

(51) Int. Cl.

| | |
|---|---|
| ***G06F 9/54*** | (2006.01) |
| ***G06F 12/0862*** | (2016.01) |
| ***G06F 12/1036*** | (2016.01) |
| ***G06F 12/1045*** | (2016.01) |
| ***G06F 13/14*** | (2006.01) |
| ***G06F 13/28*** | (2006.01) |
| ***G06F 13/38*** | (2006.01) |
| ***G06F 13/40*** | (2006.01) |
| ***G06F 13/42*** | (2006.01) |
| ***G06F 15/173*** | (2006.01) |
| ***H04L 1/00*** | (2006.01) |
| ***H04L 43/0876*** | (2022.01) |
| ***H04L 43/10*** | (2022.01) |
| ***H04L 45/00*** | (2022.01) |
| ***H04L 45/02*** | (2022.01) |
| ***H04L 45/021*** | (2022.01) |
| ***H04L 45/028*** | (2022.01) |
| ***H04L 45/12*** | (2022.01) |
| ***H04L 45/122*** | (2022.01) |
| ***H04L 45/125*** | (2022.01) |
| ***H04L 45/16*** | (2022.01) |
| ***H04L 45/24*** | (2022.01) |
| ***H04L 45/42*** | (2022.01) |
| ***H04L 45/745*** | (2022.01) |
| ***H04L 47/10*** | (2022.01) |
| ***H04L 47/11*** | (2022.01) |
| ***H04L 47/12*** | (2022.01) |
| ***H04L 47/122*** | (2022.01) |
| ***H04L 47/20*** | (2022.01) |
| ***H04L 47/22*** | (2022.01) |
| ***H04L 47/24*** | (2022.01) |
| ***H04L 47/2441*** | (2022.01) |
| ***H04L 47/2466*** | (2022.01) |
| ***H04L 47/2483*** | (2022.01) |
| ***H04L 47/30*** | (2022.01) |
| ***H04L 47/32*** | (2022.01) |
| ***H04L 47/34*** | (2022.01) |
| ***H04L 47/52*** | (2022.01) |
| ***H04L 47/62*** | (2022.01) |
| ***H04L 47/625*** | (2022.01) |
| ***H04L 47/6275*** | (2022.01) |
| ***H04L 47/629*** | (2022.01) |
| ***H04L 47/76*** | (2022.01) |
| ***H04L 47/762*** | (2022.01) |
| ***H04L 47/78*** | (2022.01) |
| ***H04L 47/80*** | (2022.01) |
| ***H04L 49/00*** | (2022.01) |
| ***H04L 49/101*** | (2022.01) |
| ***H04L 49/15*** | (2022.01) |
| ***H04L 49/90*** | (2022.01) |
| ***H04L 49/9005*** | (2022.01) |
| ***H04L 49/9047*** | (2022.01) |
| ***H04L 67/1097*** | (2022.01) |
| ***H04L 69/22*** | (2022.01) |
| ***H04L 69/40*** | (2022.01) |
| *H04L 45/28* | (2022.01) |
| *H04L 45/7453* | (2022.01) |
| *H04L 69/28* | (2022.01) |

(52) U.S. Cl.

CPC ........ *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(56) References Cited

U.S. PATENT DOCUMENTS

| | | | | |
|---|---|---|---|---|
| 2011/0110383 | A1* | 5/2011 | Yang ..................... | H04L 49/901 370/463 |
| 2011/0320724 | A1* | 12/2011 | Mejdrich ................ | G06F 13/28 711/125 |
| 2013/0138836 | A1* | 5/2013 | Cohen ................... | H04L 49/351 709/250 |
| 2014/0258438 | A1* | 9/2014 | Ayoub .................... | G06F 13/28 709/212 |
| 2015/0172226 | A1* | 6/2015 | Borshteen ........... | H04L 49/9057 370/412 |
| 2016/0342547 | A1* | 11/2016 | Liss .................... | G06F 13/4282 |

* cited by examiner

SYSTEM AND METHOD FOR FACILITATING DYNAMIC COMMAND MANAGEMENT IN A NETWORK INTERFACE CONTROLLER (NIC)

CROSS REFERENCE TO RELATED APPLICATIONS

This application is a continuation of U.S. patent application Ser. No. 17/594,610, filed on Oct. 24, 2021, which application is a national stage of International Application No. PCT/US2020/024250, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

FIELD

Background

This is generally related to the technical field of networking. More specifically, this disclosure is related to systems and methods for facilitating a network interface controller (NIC) with efficient command management.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient command management is provided. The NIC can be equipped with a host interface, an arbitration module, and a command management module. During operation, the host interface can couple the NIC to a host device. The arbitration module can select a command queue of the host device for obtaining a command. The command management module can determine whether an internal buffer associated with the command queue includes a command. If the internal buffer includes the command, the command management module can obtain the command from the internal buffer. On the other hand, if the internal buffer is empty, the command management module can obtain the command from the command queue via the host interface.

BRIEF DESCRIPTION OF THE FIGURES

In the figures, like reference numerals refer to the same figure elements.

DETAILED DESCRIPTION

Figure 1:
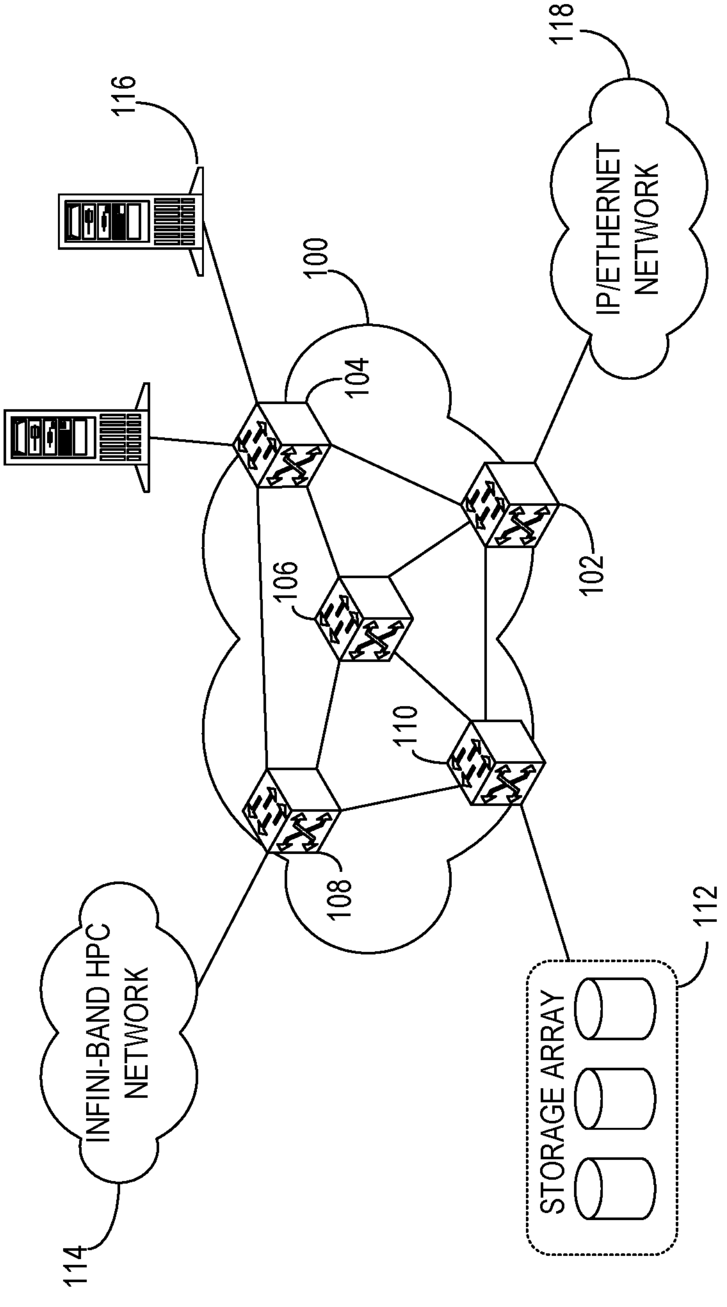
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate dynamic command management in a network interface controller (NIC). The NIC allows a host to communicate with a data-driven network.

The embodiments described herein solve the problem of efficiently transferring commands to a NIC by (i) facilitating a command queue in the host device and an internal command buffer in the NIC for large-scale and low-latency command transfers, respectively, and (ii) dynamically selecting between the command queue and internal buffer for receiving a command.

During operation, a host device of a NIC can issue a command for a data operation (e.g., a "GET" or a "PUT" command of remote direct memory access (RDMA)) to the NIC. Consequently, the host device can transfer the command (e.g., a direct memory access (DMA) descriptor of the command) to the NIC. If the host device needs to transfer a large number of commands to the NIC, the host device may store the commands in a command queue of the host device. The host device may maintain the command queue in the memory of the host device. When the NIC is ready for a new command (e.g., has available resources for the next command), the NIC can request the command from the host device. The processor of the host device can then transfer the command to the NIC.

This read-based approach is based on the NIC accessing the memory of the host device. Therefore, the read-based approach can be referred to as the memory-based command path. The memory-based command path can allow large-scale transfer to the NIC and facilitate efficient bandwidth utilization of the internal bandwidth of the host device. However, the memory-based command path can have high latency for the command transfer because the interface system (or processor interface) can be accessed multiple times for accessing the command.

To transfer a command with low latency, the host device may transfer commands associated with small amounts of data to an internal command buffer of the NIC. In some embodiments, the processor of the host device may write in the internal buffer of the NIC. This write-based approach can provide data transfer with low latency. Therefore, the write-based approach can be referred to as the low-latency command path. However, the low-latency command path can limit the volume of transfer since the internal buffer of the NIC can have limited capacity.

To solve this problem, the NIC can combine both approaches to facilitate an efficient transfer rate with low latency. The host device may maintain a command queue for a respective flow of commands (e.g., based on traffic class) in the memory of the host device. If an application issues a command for the NIC, the command can be stored in a corresponding command queue. The host device can then notify the NIC regarding the new command by advancing a write pointer. Since any application may write in the command queue, this approach can be independent of the application. The NIC can then issue a read operation to the command queue and advance a pre-fetch pointer of the queue. When the data is returned, the NIC can process the command and advance a read pointer.

However, if the command queue likely to be empty (i.e., any commands previously written to the command queue are known to have been, or are likely to have been processed by the NIC)), the host device may insert a command into the internal buffer of the NIC. The NIC may maintain an internal buffer for a respective command queue of the host device. The buffer can have a fixed size that may host a limited number of commands. Since the command can be directly written into the internal buffer, the NIC can avoid a round trip data exchange via the internal communication channel (e.g., a peripheral component interconnect express (PCIe) channel). In this way, the NIC can reduce the latency of issuing commands to the NIC. By dynamically switching between the command paths, the host device can select a command path that can efficiently transfer commands.

One embodiment of the present invention provides a NIC that can be equipped with a host interface, an arbitration logic block, and a command management logic block. During operation, the host interface can couple the NIC to a host device. The arbitration logic block can select a command queue of the host device for obtaining a command. The command management logic block can receive the command via the host interface and determine whether an internal buffer associated with the command queue includes a command. If the internal buffer includes the command, the command management logic block can obtain the command from the internal buffer. On the other hand, if the internal buffer is empty, the command management logic block can obtain the command from the command queue via the host interface.

In a variation on this embodiment, the command management logic block can provide the host device one or more of: (i) processing information associated with the internal buffer, and (ii) state information comprising a read pointer of the command queue.

In a variation on this embodiment, the command management logic block can determine that the command queue has a new command based on the advancement of a write pointer of the command queue.

In a variation on this embodiment, the arbitration logic block can select the command queue from a plurality of command queues in a memory of the host device.

In a further variation, the NIC can also include a corresponding internal buffer for a respective command queue.

In a variation on this embodiment, the command management logic block may drop a new command received from the host interface and destined for the internal buffer upon determining one or more of: (i) insufficient capacity in the internal buffer to accommodate the new command, and (ii) the command queue is not empty.

In a variation on this embodiment, in response to receiving the new command, the command management logic block can advance a write pointer of the command queue, thereby determining the presence of a command in the command queue.

In a variation on this embodiment, the command management logic block can advance a pre-fetch pointer of the command queue upon requesting the command and advance a read pointer of the command queue upon receiving data associated with the command.

In a variation on this embodiment, the host interface can be a peripheral component interconnect express (PCIe) interface. The command management logic block can then obtain the command from the command queue based on a PCIe read.

In a variation on this embodiment, the command can include an RDMA command.

One embodiment of the present invention provides a computer system that can include a memory device, a host interface, and a command management system. The memory device can store a command queue. The host interface can couple a NIC, which can maintain an internal buffer associated with the command queue. During operation, the system can write a command to the command queue and determine, based on states of the command queue, whether the internal buffer can accept the command. If the internal buffer can accept the command, the system can write, via the host interface, the command into the internal buffer. On the other hand, if the internal buffer cannot accept the command, the system can inform the NIC, via the host interface, that the command has been written into the command queue.

In a variation on this embodiment, the state of the command queue indicates whether the command queue is empty.

In a variation on this embodiment, the system can obtain statistics associated with the performance of the internal buffer and speculatively determine, based on the obtained statistics, whether the command queue is expected to be empty.

In a variation on this embodiment, informing the NIC can include advancing a write pointer of the command queue.

In a variation on this embodiment, the memory device can store a plurality of command queues.

In a variation on this embodiment, the system can write a plurality of commands into the command queue based on a granularity of allowed writes into the command queue. Subsequently, the system can advance a write pointer of the command queue according to the granularity.

In a variation on this embodiment, if the internal buffer cannot accept the command, the system can select the command in the command queue as a backup command.

In a further variation, the NIC can obtain the command from the command queue via the host interface if the command has been dropped at the internal buffer.

In a variation on this embodiment, the host interface can be a PCIe interface. The system can then write the command into the internal buffer based on a PCIe write.

In a variation on this embodiment, the command can include an RDMA command.

Figure 2A:
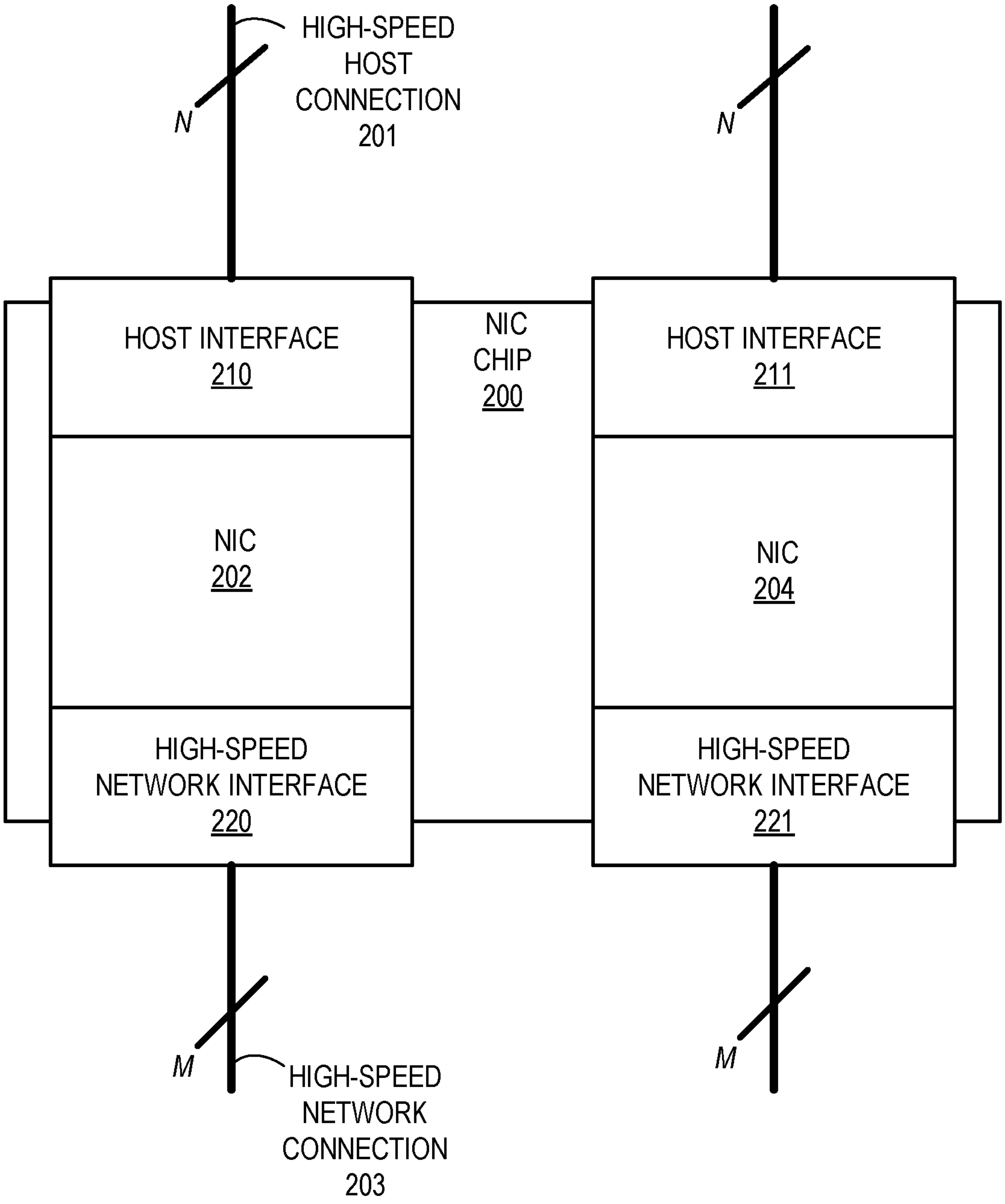
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient command management.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
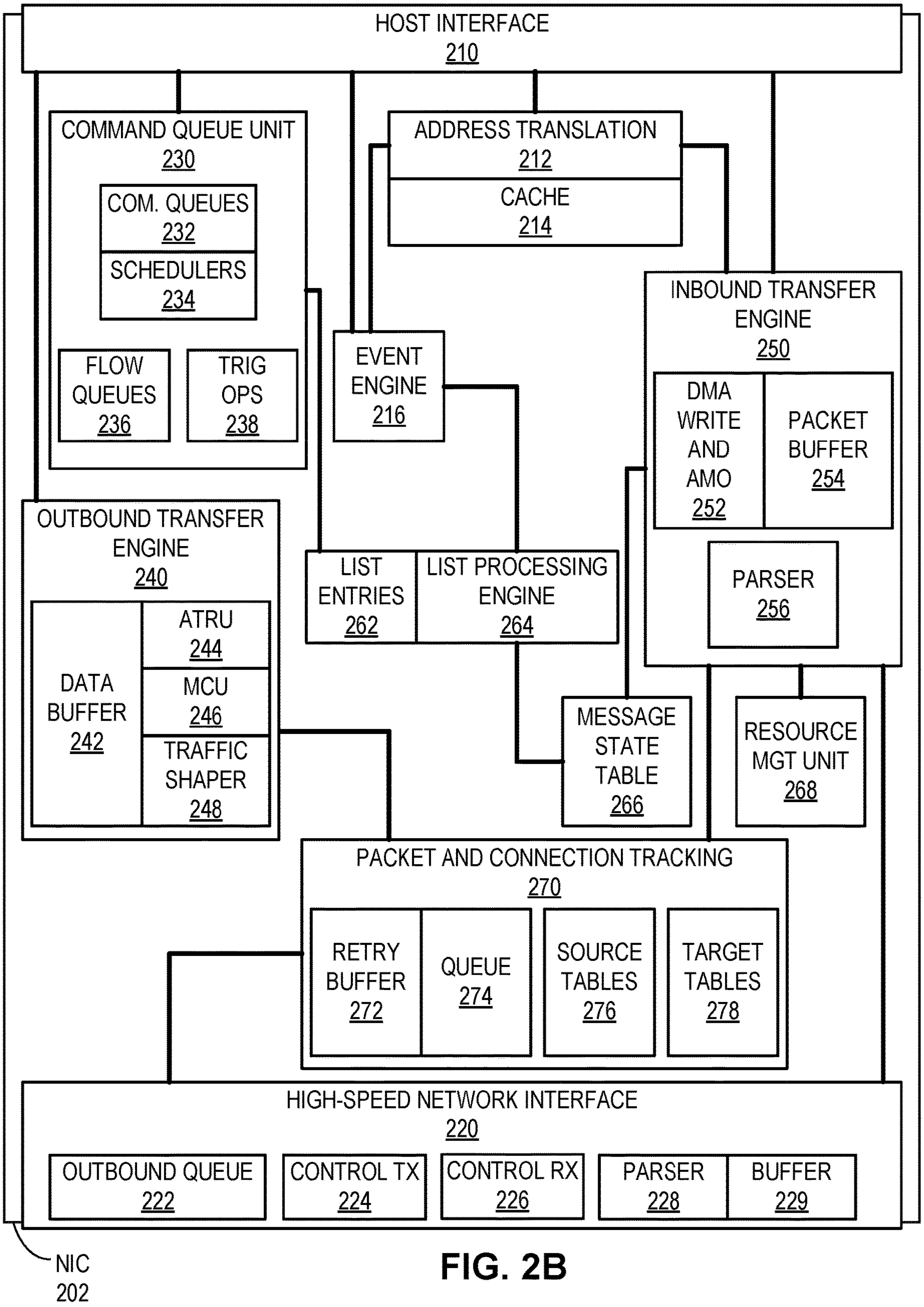
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be retrieved from retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. An event can be an internal control message for communication among the elements of NIC 202. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET request), the packet can be passed to the OXE 240. NIC 202 can also include an EE 216, which can receive requests to generate event notifications from other modules or units in NIC 202. An event notification can specify that either a full event or a counting event is generated. EE 216 can manage event queues, located within host processor memory, to which it writes full events. EE 216 can forward counting events to CQ unit 230.

Dynamic Command Management in NIC

Figure 3A:
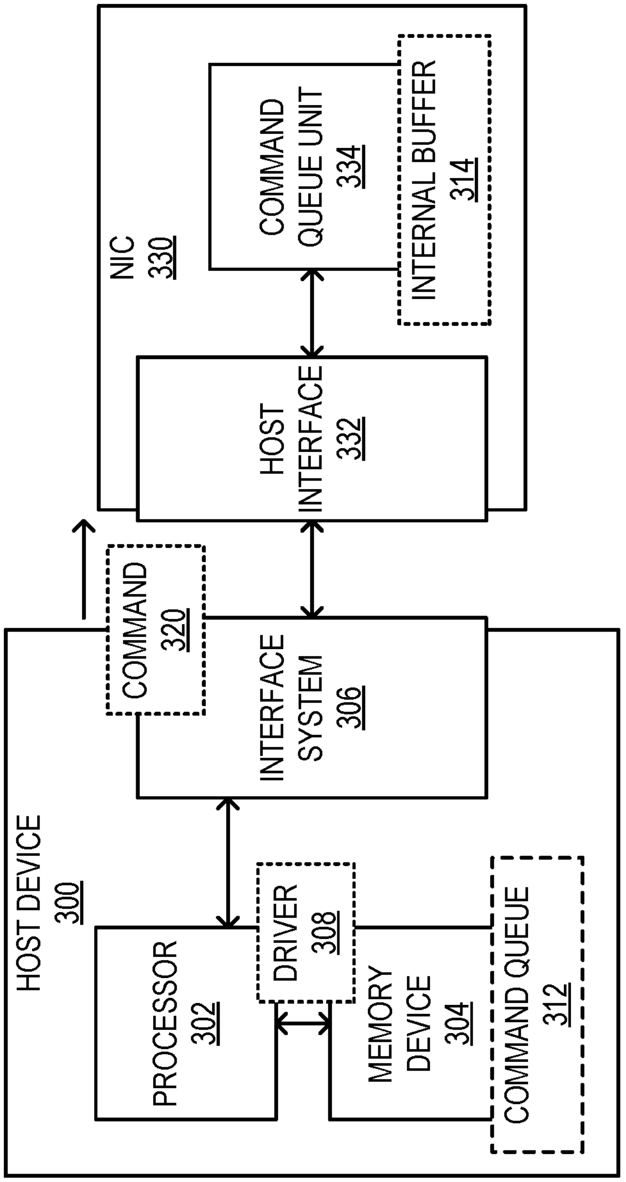
FIG. 3A shows an exemplary dynamic command management process in a NIC.

FIG. 3A shows an exemplary dynamic command management process in a NIC. In this example, a host device 300 can be equipped with a NIC 330. Device 300 can include a processor 302, a memory device 304, and an interface system 306. An HI 332 of NIC 330 can be coupled to interface system 306 of device 300. In some embodiments, HI 332 can be a PCIe interface, and interface system 306 can be a PCIe system that provides a slot for HI 332. NIC 330 can also include a command queue unit 334 for managing incoming commands from device 300, as described in conjunction with FIG. 2A.

During operation, device 300 can issue a command 320 for an operation (e.g., an RDMA operation). To transfer the command, host 300 may generate a descriptor of command (e.g., a DMA descriptor) and transfer command 320 to NIC 330. If command 320 is one of a large number of commands, device 300 can store command 320 in a command queue 312 in memory device 304. When NIC 330 has available resources for the next command, NIC 330 can request a command from device 300. If command 320 is the next command, processor 302 can transfer command 320 to NIC 330 via HI 332. Here, NIC 330 can read commands from memory device 304 of host 300. This memory-based command path can allow large-scale command transfer to NIC 300, thereby facilitating efficient bandwidth utilization of interface system 306.

However, the memory-based command path can have high latency for the command transfer because interface system 306 can be accessed multiple times for accessing command 320. Alternatively, if command 320 is associated with a small amount of data (e.g., within a threshold), device 300 may transfer command 320 to an internal command buffer 314 in NIC 330. In some embodiments, processor 302 may write in internal buffer 314. This low-latency command path can provide data transfer with low latency. However, the low-latency command path can limit the volume of transfer since internal buffer 314 can have limited capacity.

To solve this problem, NIC 330 can combine both command paths to facilitate an efficient transfer rate with low latency. Furthermore, device 300 may maintain a plurality of command queues, each for a respective flow of commands, in memory device 304. Command queue 312 can be one of the command queues. When an application running on device 300 issues command 320 for NIC 330, command 320 can be stored in command queue 312. Device 300 can then notify NIC 330 regarding command 320 by advancing a write pointer of command queue 312. NIC 330 can then issue a read operation to command queue 312 via HI 332 and advance a pre-fetch pointer of command queue 312. When the data is returned for command 320, NIC 330 can process command 320 and advance a read pointer of command queue 312.

However, if command queue 312 is empty, device 300 may insert command 320 into internal buffer 314. NIC 330 may maintain an internal buffer for a respective command queue of device 300. Internal buffer 314 can be managed by command queue unit 334. Internal buffer 314 can have a fixed size that may store a limited number of commands. Since command 320 can be directly written into internal buffer 314, NIC 330 can avoid a round trip data exchange with processor 302 via interface channel 306. In this way, internal buffer 314 can reduce the latency of issuing commands to NIC 330. By dynamically switching between command queue 312 and internal buffer 314, host 300 can select a command path that can efficiently transfer commands to NIC 330.

In some embodiments, a device driver 308 of NIC 330 running on the operating system of host 300 may select the command path. Driver 308 can dynamically determine whether to use the memory-based or low-latency command path for a respective command (i.e., on a command-by-command basis). Driver 308 may determine whether there is an outstanding command in command queue 312 and internal buffer 314 based on information from NIC 330. For example, NIC 330 can provide the current locations of one or more pointers of command queue 312 to driver 308. In addition, NIC 330 may also provide statistics on how effectively internal buffer 314 is used. Driver 308 can determine whether to select internal buffer 314 for transferring the next command.

Furthermore, driver 308 can speculatively determine that internal buffer 314 should have available capacity. Based on the determination, driver 308 may select internal buffer 314 for issuing a command if the current status of command queue 312 and internal buffer 314 meet the selection criteria. Otherwise, driver 308 may use command queue 312. Accordingly, NIC 330 can obtain a command from internal buffer 314 if possible. Otherwise, NIC 330 can obtain a command from command queue 312.

Figure 3B:
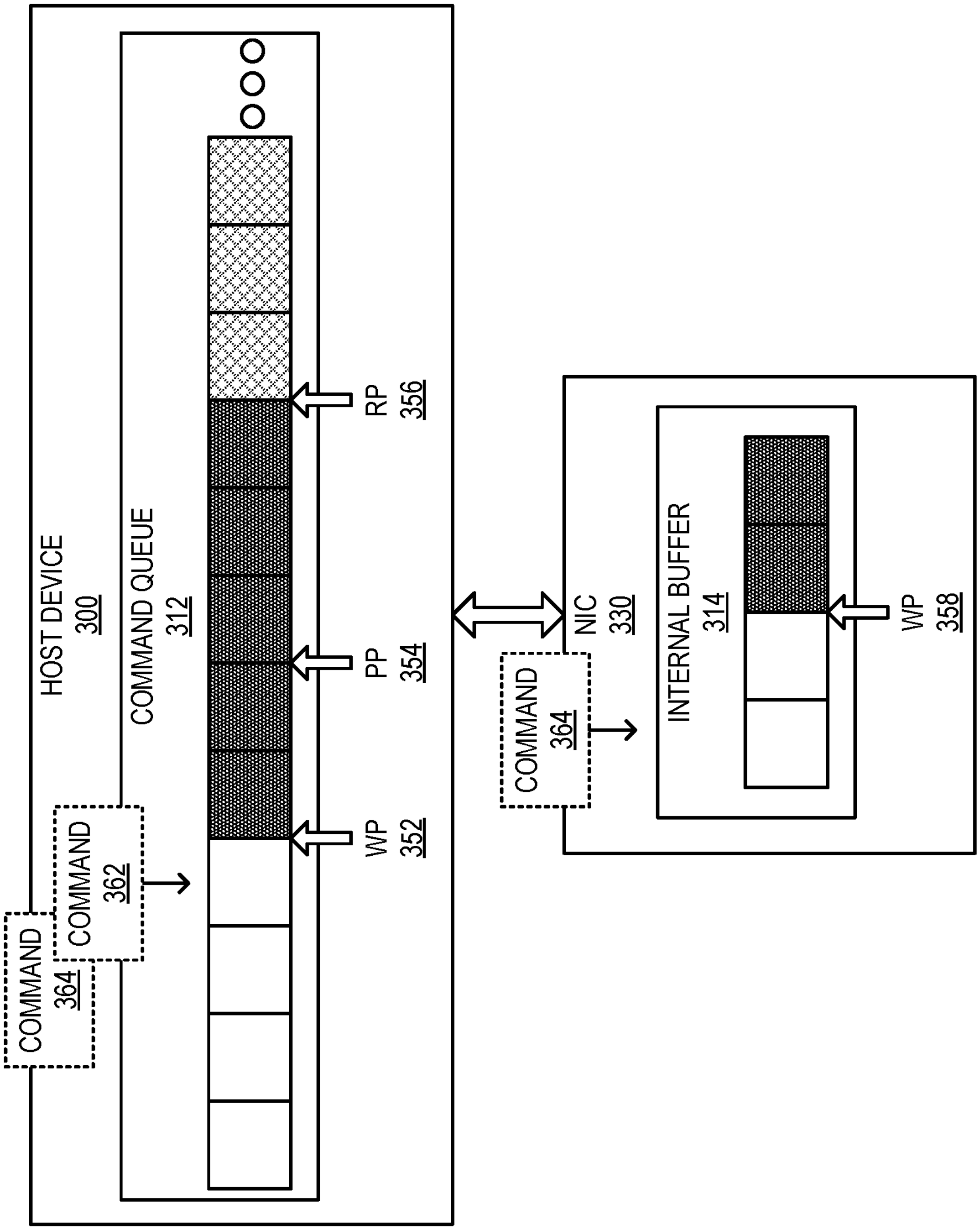
FIG. 3B shows exemplary queues for facilitating dynamic command management in a NIC.

FIG. 3B shows exemplary queues for facilitating dynamic command management in a NIC. The operations on command queue 312 can be based on the operations of a circular buffer. During operation, if device 300 determines that a command 362 should be issued to command queue 312, device 300 can format command 362. Device 300 can then store command 362 in command queue 312 at the location indicated by a write pointer 352. Device 300 can then advance write pointer 352 to the next memory location. Advancing write pointer 352 can trigger a notification (or a "doorbell") for NIC 330. Device 300 can write a plurality of commands to command queue 312 before advancing write pointer 352. In some embodiments, the granularity of advancing write pointer 352 can be configured at device 300 (e.g., by a user).

Based on the trigger, NIC 330 can determine that command queue 312 has a new command. If NIC 330 selects command queue 312 for processing (e.g., based on an arbitration process among the command queues), NIC 330 can read a command indicated by pre-fetch pointer 354 from command queue 312 and advance pre-fetch pointer 354. For example, if pre-fetch pointer 354 represents the location of command 362, NIC 330 can read command 362 from command queue 312. When the data associated with command 362 is returned to NIC 330, NIC 330 can process command 362 and advance a read pointer 356.

In some embodiments, advancing read pointer 356 can include updating an application-visible copy of read pointer 356 according to a queue-specific policy. NIC 330 can continue to read commands from command queue 312 until the processing resources (e.g., the execution units described in conjunction with FIG. 2B) of NIC 330 have sufficient commands to execute. NIC 330 may stop reading commands if pre-fetch pointer 354 reaches write pointer 352 (e.g., if command queue 312 is empty). Since command queue 312 can be circular queue with a fixed size, device 330 may pause issuing commands to command queue 312 if write pointer 352 reaches read pointer 356. Write pointer 352 reaching read pointer 356 can indicate that command queue 312 is full and cannot accept a new command. Pointers 352, 354, and 356 can indicate a location or position in command queue 312. For example, pointers 352, 354, and 356 can represent indices of command queue 312 (e.g., array indices) or memory pointers indicating memory locations.

On the other hand, device 300 may determine that a command 364 should be issued to internal buffer 314 if device 300 determines or speculates that command queue 312 is empty. Device 300 can then format command 364 and store command 364 in command queue 312 at the location indicated by a write pointer 352. However, device 300 may not advance write pointer 352 and instead, may write command 364 into internal buffer 364 if device 300 determines or speculates that internal buffer 314 has sufficient capacity to accommodate command 364. Device 300 may perform the write operation using a PCIe based write operation. A write memory barrier, such as an SFENCE instruction, can be used between the respective writes to command queue 312 and internal buffer 314.

Upon detecting the write operation in internal buffer 314, NIC 330 can advance write pointer 358. When NIC 330 selects command queue 312 for processing a command, NIC 330 determines that internal buffer 314 stores a command. Accordingly, NIC 330 reads from internal buffer 314 instead of issuing an interface-based read, such as PCIe read, to command queue 312. Upon obtaining command 364 from internal buffer 314, NIC 330 can advance pre-fetch pointer 354.

It should be noted that the write operations to internal buffer 314 may arrive out of order. Furthermore, the granularity of the write operations can be smaller than that of some commands NIC 330 can track partial write operations to internal buffer 314 and advance write pointer 352 when the write operations within a block of internal buffer 314 have completed. If internal buffer 314 still includes data of a previous write operation, or command queue 312 has not been empty (i.e., pre-fetch pointer 354 has not been equal to write pointer 352) when operation 364 is issued, NIC 330 may drop command 364. Command 364 in command queue 312 can then operate as the backup command. When NIC 330 has available resources for executing another command, NIC 330 may obtain the next command from command queue 312.

Figure 4A:
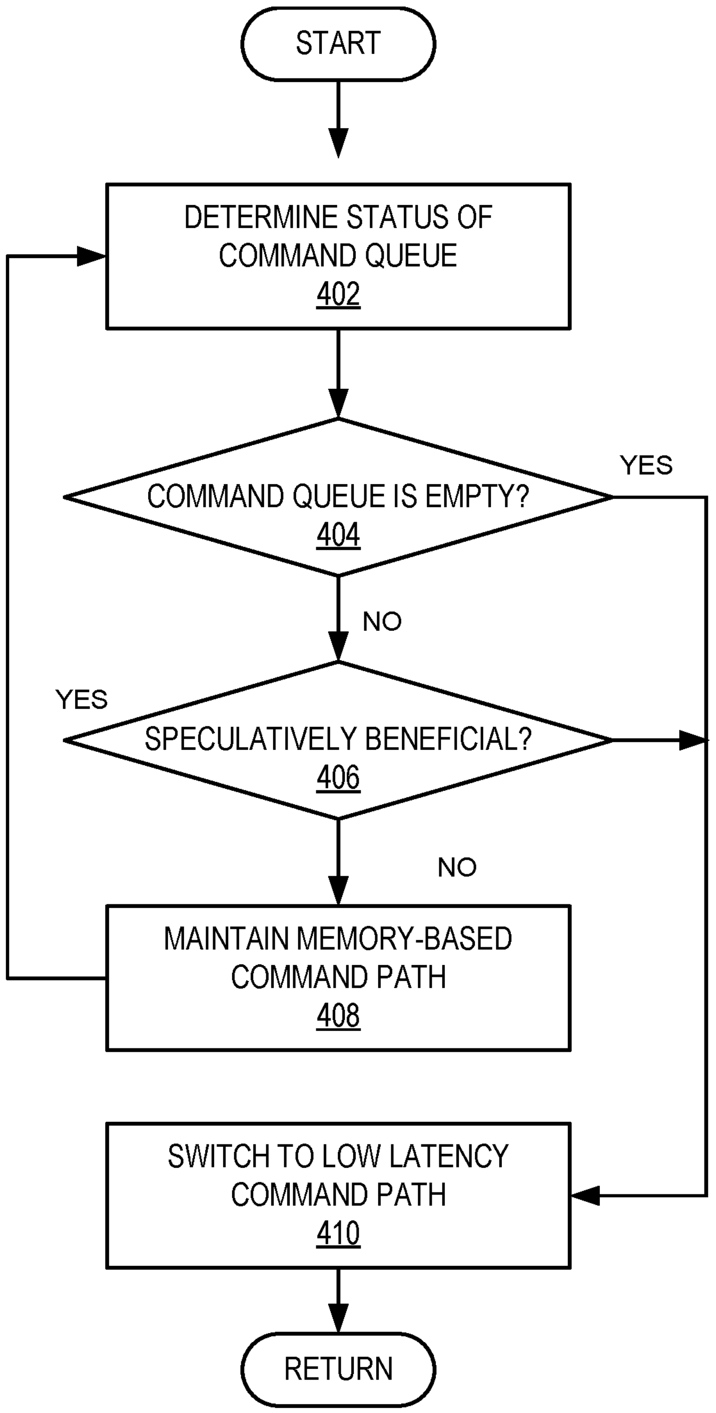
FIG. 4A shows a flow chart of a dynamic queue selection process for processing commands in a NIC.

FIG. 4A shows a flow chart of a dynamic queue selection process for processing commands in a NIC. During operation, the host device of the NIC can obtain the last-known status of the command queue (operation 402). The device can then determine whether the command queue is empty (operation 404). If the command queue is not empty, the device may determine whether issuing commands to the internal buffer is speculatively beneficial (operation 406). For example, if the command queue is likely to be empty, issuing commands to the internal buffer can be speculatively beneficial.

If issuing commands is not speculatively beneficial, the device can maintain memory-based command path (operation 408) and continue to obtain the status of the command queue (operation 402). On the other hand, if the command queue empty (operation 404) or issuing commands is speculatively beneficial (operation 406), the device can switch to the low-latency command path (operation 410). It should be noted that the memory-based command path can be the default option for the device. Unless switched to the low-latency command path, the device can continue to use the memory-based command path to transfer commands to the NIC.

Figure 4B:
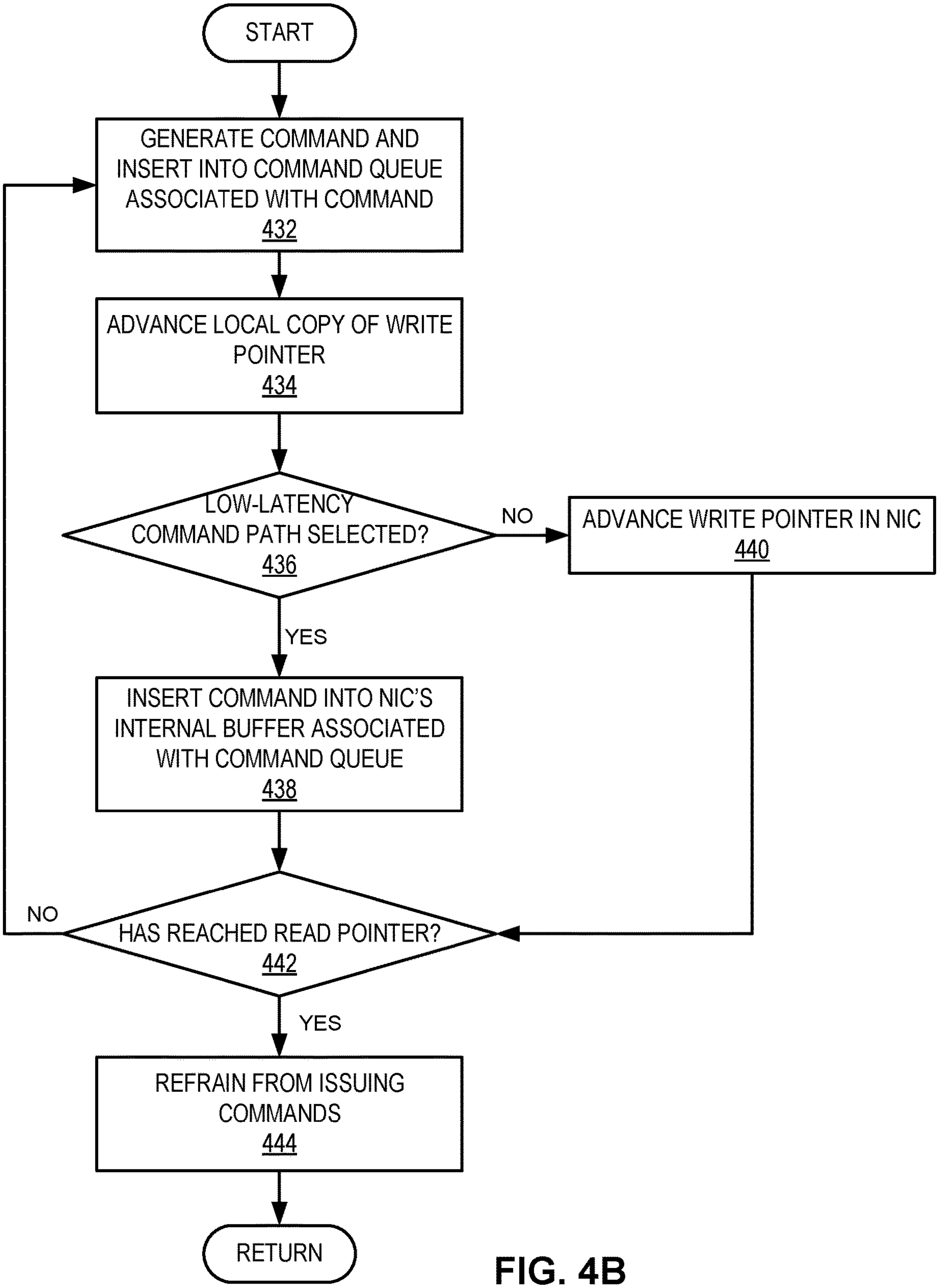
FIG. 4B shows a flow chart of a dynamic command management process of a host device.

FIG. 4B shows a flow chart of a dynamic command management process of a host device. During operation, the device can generate a command (e.g., in a format acceptable by a NIC of the device) insert the command into a command queue associated with the command (operation 432), and advance the device's copy of the write pointer (operation 434). The device can then check whether the low-latency command path is selected (operation 436). If the low-latency command path is selected, the device can also insert the command into the NIC's internal buffer associated with the command queue (operation 438).

If the low-latency command path is not selected (operation 434), the device can advance the write pointer in the NIC (operation 440). The device can check whether the device's copy of the write pointer has reached the read pointer (operation 442). If the write pointer has not reached the read pointer, the device can continue to generate a command and insert the command into a command queue associated with the command (operation 432). However, if the write pointer has reached the read pointer, the command queue can be full, and the device can refrain from issuing more commands (operation 444).

Figure 4C:
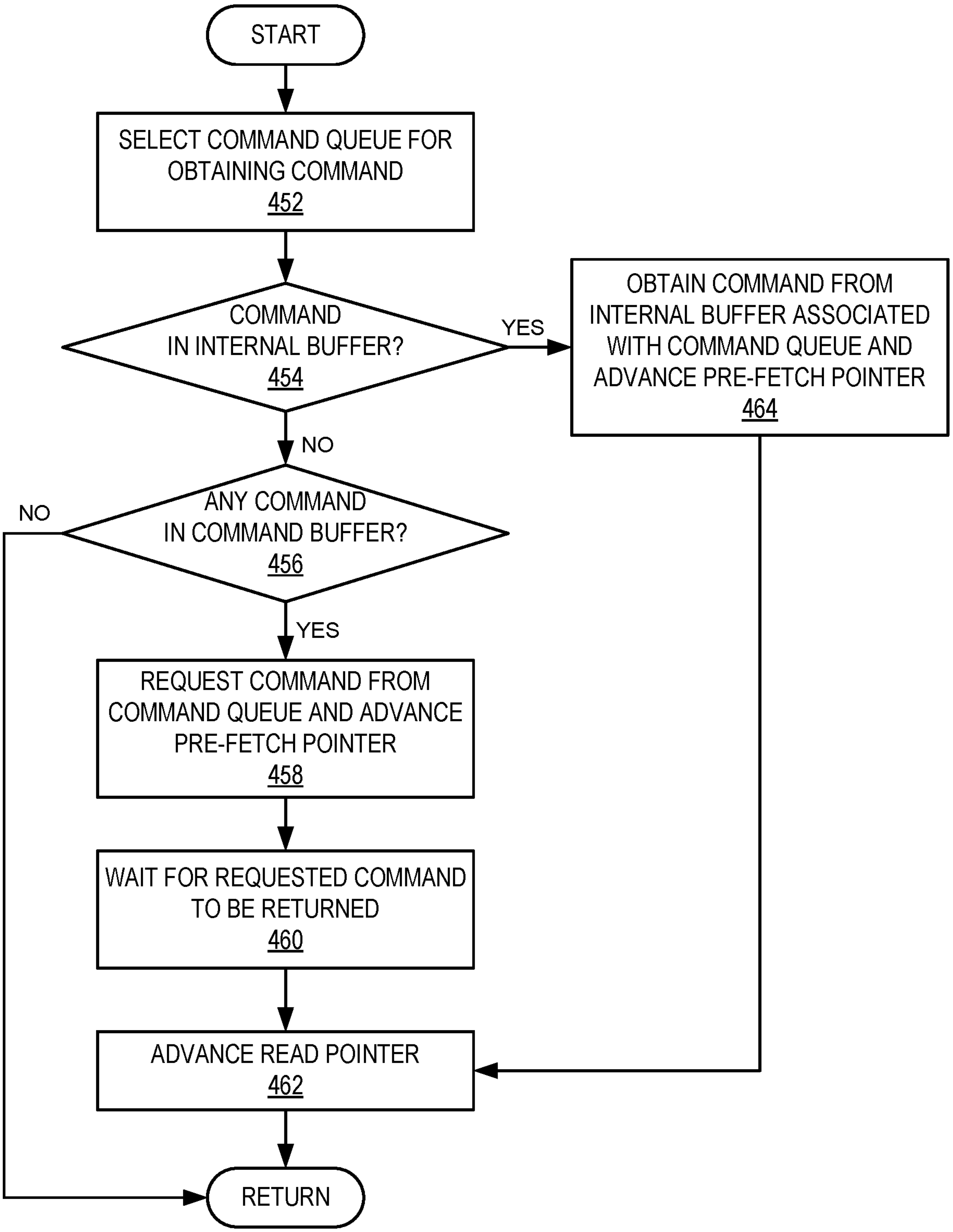
FIG. 4C shows a flow chart of a dynamic command management process of the memory-based command path in a NIC.

FIG. 4C shows a flow chart of a dynamic command management process of the memory-based command path in a NIC. During operation, the NIC can select a command queue for obtaining a command (e.g., based on an arbitration process) (operation 452) and check whether a corresponding internal buffer includes a command (operation 454). If the internal buffer does not include the command, the NIC can determine whether there is a command in the command queue (operation 456). If there is a command in the command queue, the NIC can request the command from the command queue and advance the pre-fetch pointer (operation 456).

The NIC can then wait for the requested command to be returned (operation 460). On the other hand, if the internal buffer includes the command, the NIC can obtain the command from the internal buffer associated with the command queue and advance the pre-fetch pointer (operation 464). Upon obtaining the command (operation 460 or 464), the NIC can advance the read pointer (operation 462).

Figure 4D:
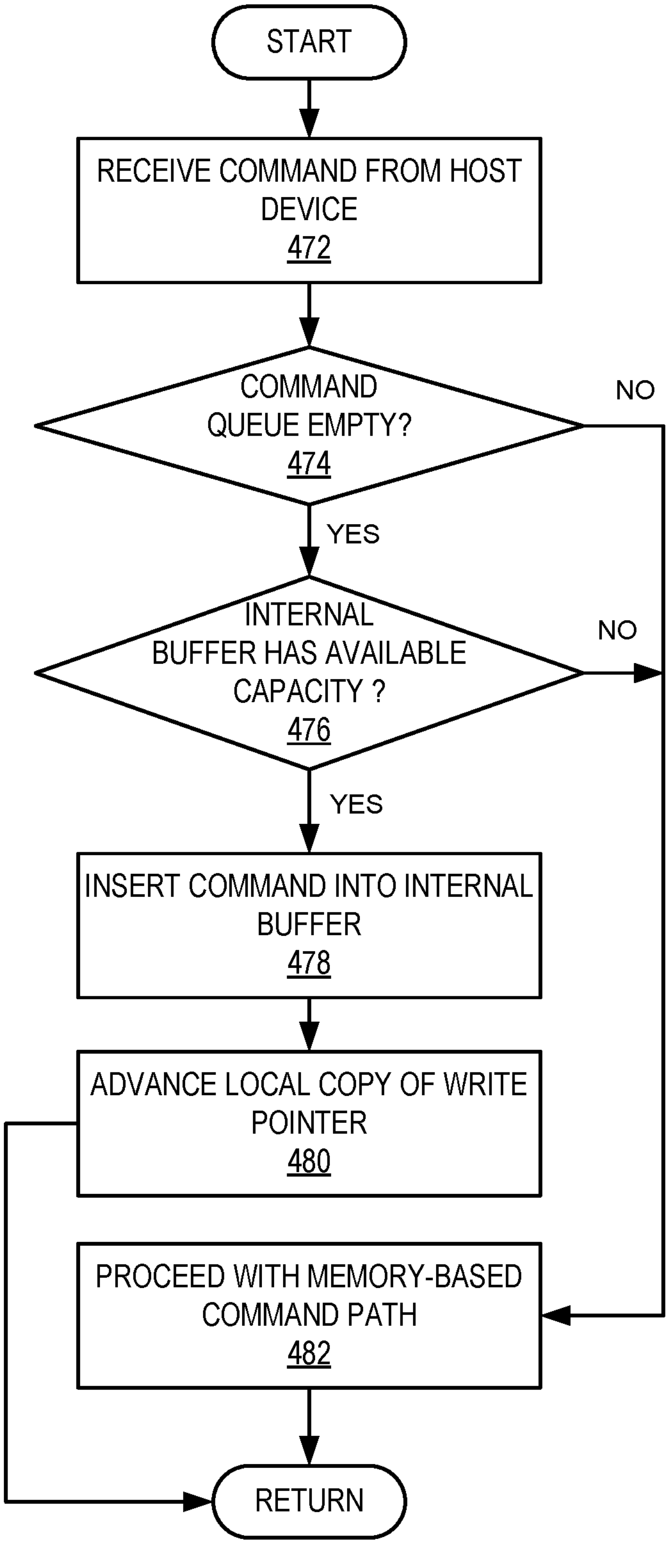
FIG. 4D shows a flow chart of a dynamic command management process of the low-latency command path in a NIC.

FIG. 4D shows a flow chart of a command management process of the low-latency command path in a NIC. During operation, the NIC can receive a command from the host device (operation 472) and determine whether the command queue is empty (operation 474). If the command queue is empty, the NIC can determine whether the internal buffer has available capacity to accommodate the received command (operation 476). If the internal buffer has available capacity, the NIC can insert the command into the internal buffer (operation 478) and advance the local copy (i.e., the copy of the NIC) of the write pointer (operation 480). On the other hand, if the command queue is not empty (operation 474) or the internal buffer does not have available capacity (operation 476), the NIC can proceed with the memory-based command path (operation 482).

Exemplary Computer System

Figure 5:
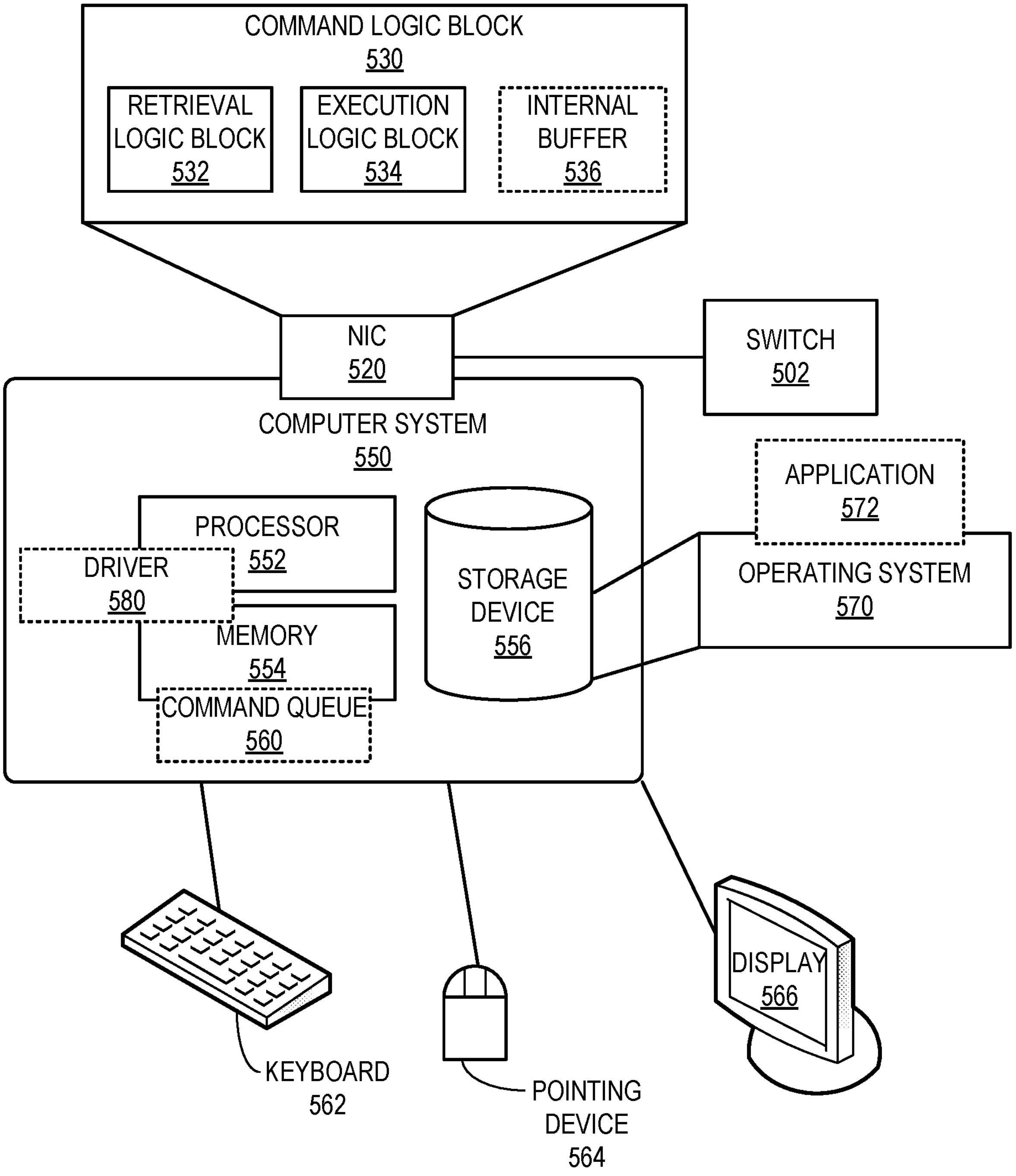
FIG. 5 shows an exemplary computer system equipped with a NIC that facilitates dynamic command management.

FIG. 5 shows an exemplary computer system equipped with a NIC that facilitates dynamic command management. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient command management. NIC 520 can provide one or more HNIs to computer system 550. NIC 520 can be coupled to a switch 502 via one of the HNIs. NIC 520 can include a command logic block 530, as described in conjunction with FIGS. 2B and 3. Command logic block 530 can include a retrieval logic block 532 and an execution logic block 534. Retrieval logic block 532 can provide information associated with the state of the command queue 560, as known by command logic block 530, to computer system 550 via the HI.

Device driver 580 of NIC 520 running on operating system 570 may select a command path based on the provided information. Driver 580 can dynamically determine whether to use the memory-based or low-latency command path based on the current state of a command queue 560 in memory device 554. Furthermore, driver 580 can speculatively determine that command queue 560 is likely to be empty and internal buffer 536 should have available capacity. Accordingly, NIC 520 can obtain a command from internal buffer 536 if possible. Otherwise, NIC 520 can obtain a command from command queue 560.

Retrieval logic block 532 can determine whether an internal buffer 536 of NIC 220 includes a command. If internal buffer 536 includes a command, retrieval logic block 532 can obtain the command from internal buffer 536. On the other hand, if internal buffer 536 does not include a command, retrieval logic block 532 can obtain a command from command queue 560 in memory device 554. In either case, retrieval module 532 can advance a pre-fetch pointer. Execution logic block 534 can execute the command Execution logic block 534 can then advance a read pointer.

In summary, the present disclosure describes a NIC that facilitates efficient command management. The NIC can be equipped with a host interface, an arbitration logic block, and a command management logic block. During operation, the host interface can couple the NIC to a host device. The arbitration logic block can select a command queue of the host device for obtaining a command. The command management logic block can determine whether an internal buffer associated with the command queue includes a command. If the internal buffer includes the command, the command management logic block can obtain the command from the internal buffer. On the other hand, if the internal buffer is empty, the command management logic block can obtain the command from the command queue via the host interface.

The methods and processes described above can be performed by hardware logic blocks, modules, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:

setting, on a computer system, a first operating mode for processing commands in a host device and a network interface controller (NIC) of the computer system, the first operating mode comprising processing the commands via a read-based command path in which the NIC reads a respective command from a command queue maintained in a memory of the host device;

determining whether the command queue in the host device is empty;

in response to determining that the command queue is empty or, based on current locations of points of the command queue, is to be empty, switching from the first operating mode to a second operating mode, the second operating mode comprising processing the commands via a write-based command path in which the host device writes the respective command to an internal buffer maintained by the NIC and corresponding to the command queue;

storing, in the command queue, a command received from an application; and in response to the second operating mode being set, writing the command into the internal buffer maintained by the NIC without advancing a write pointer of the command queue.

2. The method of claim 1, further comprising:

determining a status of the command queue in the host device; and obtaining metrics associated with usage of the internal buffer corresponding to the command queue, wherein switching from the first operation mode to the second operation mode is based on the status and the metrics.

3. The method of claim 1, further comprising:

in response to determining that the command queue is not empty and that the internal buffer does not have available capacity:

in response to the first operating mode being currently set on the computer system, remaining in the first operating mode; or in response to the second operating mode being currently set on the computer system, switching to the first operating mode.

4. The method of claim 1, further comprising:

switching from the first operating mode to the second operating mode in response to a current status of the command queue and the internal buffer meeting a selection criteria.

5. The method of claim 1, further comprising:

receiving the command; and formatting the command prior to storing the command in the command queue.

6. The method of claim 5, further comprising:

in response to determining that the first operating mode is set on the computer system:

advancing, in the command queue, a write pointer associated with commands stored therein, wherein advancing the write pointer notifies the NIC that one or more commands are stored in the command queue.

7. The method of claim 5, further comprising:

receiving, by the NIC, a notification that one or more commands are stored in the command queue;

obtaining a command from the command queue in response to receiving the notification; and advancing, by the NIC, a read pointer associated with the command queue in response to retrieving data associated with the command.

8. The method of claim 7, wherein advancing the read pointer comprises updating an application-visible copy of the read pointer based on a policy specific to the command queue.

9. The method of claim 1, wherein writing the command into the internal buffer is based on a Peripheral Component Interconnect Express (PCIe) communication.

10. The method of claim 1, further comprising:

advancing a write pointer associated with the command in the internal buffer in response to detecting the command being written into the internal buffer, wherein advancing the write pointer indicates that the internal buffer stores the command.

11. A computer system, comprising:

a processor;

a host device storing a command queue;

a network interface controller (NIC) maintaining an internal buffer corresponding to the command queue; and a storage device storing instructions which when executed by the processor cause the processor to perform a method, the method comprising:

setting a first operating mode for processing commands issued by the host device and communicated to the NIC, the first operating mode comprising processing the commands via a first command path in which the NIC reads a respective command from a command queue maintained in a memory of the host device;

obtaining statistics associated with usage of the internal buffer;

in response to the statistics indicating available capacity in the internal buffer or in response to the command queue being empty, switching from the first operating mode to a second operating mode, the second operating mode comprising processing the commands via a second command path in which the host device writes the respective command to an internal buffer maintained by the NIC and corresponding to the command queue;

storing, in the command queue, a command received from an application; and in response to the second operating mode being set, writing the command into the internal buffer maintained by the NIC without advancing a write pointer of the command queue.

12. The computer system of claim 11, the method further comprising:

in response to the command queue not being empty and the statistics not indicating available capacity in the internal buffer:

remaining in the first operating mode in response to the first operating mode being currently set on the computer system; or switching to the first operating mode in response to the second operating mode being currently set on the computer system.

13. The computer system of claim 11, the method further comprising:

receiving the command;

formatting the command prior to storing the command in the command queue; and in response to determining that the first operating mode is set on the computer system:

advancing, in the command queue, a write pointer associated with commands stored therein, wherein advancing the write pointer notifies the NIC that one or more commands are stored in the command queue.

14. The computer system of claim 11, the method further comprising:

receiving the command; and in response to the first operating mode being set:

advancing, in the command queue, a write pointer associated with commands stored therein; and notifying the NIC that one or more commands are stored in the command queue.

15. The computer system of claim 11, the NIC including a device driver, and the method further comprising:

in response to receiving one or more commands, switching, by the device driver, between the first operating mode and the second operating mode based on a status of the command queue and the statistics.

16. A non-transitory computer readable storage medium comprising instructions to:

set a first operating mode for processing commands in a computer system including a host device and a network interface controller (NIC), wherein the first operating mode comprises processing the commands via a read-based command path in which the NIC reads a respective command from a command queue maintained in a memory of the host device;

determine whether the command queue in the host device is empty;

in response to determining that the command queue is empty or in response to determining that there is available capacity in an internal buffer which corresponds to the command queue, switch from the first operating mode to a second operating mode, wherein the second operating mode comprises processing the commands via a write-based command path in which the host device writes the respective command to the internal buffer maintained by the NIC and corresponding to the command queue;

store, in the command queue, a command received from an application; and in response to the second operating mode being set, write the command into the internal buffer maintained by the NIC without advancing a write pointer of the command queue.

17. The non-transitory computer readable storage medium of claim 16, the instructions further to:

in response to determining that the command queue is not empty and that the internal buffer does not have available capacity:

in response to the first operating mode being currently set on the computer system, remain in the first operating mode; or in response to the second operating mode being currently set on the computer system, switch to the first operating mode.

18. The non-transitory computer readable storage medium of claim 16, the instructions further to:

receive the command;

format the command; and store the command in the command queue.

19. The non-transitory computer readable storage medium of claim 18, wherein the command includes a remote direct memory access (RDMA) command.

* * * * *